United States Patent
Shibayama et al.

(10) Patent No.: US 8,411,269 B2
(45) Date of Patent: *Apr. 2, 2013

(54) SPECTROSCOPIC MODULE

(75) Inventors: Katsumi Shibayama, Hamamatsu (JP);
Helmut Teichmann, Zurich (CH);
Tomofumi Suzuki, Hamamatsu (JP);
Dietmar Hiller, Zurich (CH); Ulrich Starker, Zurich (CH)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/545,445

(22) Filed: Jul. 10, 2012

(65) Prior Publication Data
US 2012/0276287 A1 Nov. 1, 2012

Related U.S. Application Data

(63) Continuation of application No. 12/377,300, filed as application No. PCT/JP2008/060384 on Jun. 5, 2008.

(30) Foreign Application Priority Data

Jun. 8, 2007 (JP) ................................ P2007-153019

(51) Int. Cl.
*G01J 3/28* (2006.01)
(52) U.S. Cl. ....................................................... 356/328
(58) Field of Classification Search .................. 356/300, 356/326, 328
See application file for complete search history.

(56) References Cited

U.S. PATENT DOCUMENTS

| 4,644,632 | A | 2/1987 | Machler et al. |
| 4,784,935 | A | 11/1988 | Ehrfeld et al. |
| 5,026,160 | A | 6/1991 | Dorain et al. |
| 5,644,124 | A | 7/1997 | Hamada et al. |
| 5,940,214 | A | 8/1999 | Suzuki et al. |
| 6,081,331 | A | 6/2000 | Teichmann |
| 6,181,418 | B1 | 1/2001 | Palumbo et al. |
| 6,303,934 | B1 | 10/2001 | Daly et al. |

(Continued)

FOREIGN PATENT DOCUMENTS

| CN | 1800941 | 7/2006 |
| DE | 197 17 015 | 10/1998 |

(Continued)

OTHER PUBLICATIONS

F. Reininger, et al., "VIRTIS: Visible Infrared Thermal Imaging Spectrometer for the Rosetta Mission," Proccedings, SPIE, vol. 2819 [Imaging Spectrometry II], Aug. 1996, pp. 66-77.

*Primary Examiner* — Tarifur Chowdhury
*Assistant Examiner* — Abdullahi Nur
(74) *Attorney, Agent, or Firm* — Drinker Biddle & Reath LLP

(57) ABSTRACT

In the spectroscopy module 1, a light detecting element 4 is provided with a light passing opening 4b through which light made incident into a body portion 2 passes. Therefore, it is possible to prevent deviation of the relative positional relationship between the light passing opening 4b and a light detection portion 4a of the light detecting element 4. Further, an optical element 7, which guides light made incident into the body portion 2, is arranged at the light passing opening 4b. Therefore, light, which is to be made incident into the body portion 2, is not partially blocked at a light incident edge portion of the light passing opening 4b, but light, which is to be made incident into the body portion 2, can be guided securely. Therefore, according to the spectroscopy module 1, it is possible to improve the reliability.

2 Claims, 3 Drawing Sheets

U.S. PATENT DOCUMENTS

| | | |
|---|---|---|
| 6,657,723 B2 | 12/2003 | Cohen et al. |
| 6,862,092 B1 | 3/2005 | Ibsen et al. |
| 7,034,935 B1 | 4/2006 | Kruzelecky |
| 7,092,090 B2 | 8/2006 | Shimizu et al. |
| 7,369,228 B2 | 5/2008 | Kerstan et al. |
| 7,605,917 B2 | 10/2009 | Teichmann et al. |
| 7,697,137 B2 | 4/2010 | Comstock, II |
| 2003/0197862 A1 | 10/2003 | Cohen et al. |
| 2004/0196458 A1 | 10/2004 | Shimizu et al. |
| 2004/0239931 A1 | 12/2004 | Teichmann et al. |
| 2005/0230844 A1 | 10/2005 | Kinsman |
| 2006/0139636 A1 | 6/2006 | Kerstan et al. |
| 2007/0002446 A1 | 1/2007 | Takeuchi et al. |
| 2007/0252989 A1 | 11/2007 | Comstock |
| 2010/0103412 A1 | 4/2010 | Shibayama et al. |
| 2010/0201980 A1 | 8/2010 | Shibayama et al. |
| 2010/0208258 A1 | 8/2010 | Shibayama et al. |
| 2010/0208259 A1 | 8/2010 | Suzuki et al. |
| 2010/0214563 A1 | 8/2010 | Suzuki et al. |
| 2010/0238439 A1 | 9/2010 | Suzuki et al. |
| 2012/0140214 A1* | 6/2012 | Shibayama et al. .......... 356/300 |

FOREIGN PATENT DOCUMENTS

| | | |
|---|---|---|
| JP | 54-143685 | 11/1979 |
| JP | S61-217017 A | 9/1986 |
| JP | 62-6126 | 1/1987 |
| JP | 63-229765 | 9/1988 |
| JP | H4-211202 A | 8/1992 |
| JP | 4-294223 | 10/1992 |
| JP | H5-149793 | 6/1993 |
| JP | 5-322653 | 12/1993 |
| JP | 6-129908 | 5/1994 |
| JP | 6-229829 | 8/1994 |
| JP | 8-145794 | 6/1996 |
| JP | 2000-065642 A | 3/2000 |
| JP | 2000-298066 | 10/2000 |
| JP | 3119917 | 10/2000 |
| JP | 2003-121349 A | 4/2003 |
| JP | 2003-139611 | 5/2003 |
| JP | 2003-161694 A | 6/2003 |
| JP | 2003-202463 | 7/2003 |
| JP | 2003-243444 | 8/2003 |
| JP | 2003-318478 | 11/2003 |
| JP | 2003-337206 | 11/2003 |
| JP | 2004-053992 | 2/2004 |
| JP | 2004-191246 | 7/2004 |
| JP | 2004-309146 A | 11/2004 |
| JP | 2004-354176 | 12/2004 |
| JP | 2004-537750 | 12/2004 |
| JP | 2005-308495 | 11/2005 |
| JP | 2006-30031 | 2/2006 |
| JP | 4887221 | 2/2012 |
| JP | 4887250 | 2/2012 |
| JP | 4887251 | 2/2012 |
| JP | 4891841 | 3/2012 |
| WO | WO 99/53350 | 10/1999 |

* cited by examiner

SPECTROSCOPIC MODULE

This is a continuation application of copending application Ser. No. 12/377,300, having a §371 date of Feb. 12, 2009, which is a national stage filing based on PCT International Application No. PCT/JP2008/060384, filed on Jun. 5, 2008. The copending application Ser. No. 12/377,300 is incorporated by reference herein in its entirety.

TECHNICAL FIELD

The present invention relates to a spectroscopy module for dispersing light to detect the light.

BACKGROUND ART

As a conventional spectroscopy module, Patent Document 1 has disclosed, for example, that which is provided with a light-transmitting supporting body, an incident slit portion which makes light incident into the supporting body, a concave diffraction grating for dispersing the light made incident into the supporting body to reflect the light and a diode for detecting the light dispersed and reflected by the concave diffraction grating.

Patent Document 1: Japanese Published Examined Patent Application No. 3119917

DISCLOSURE OF THE INVENTION

Problems to be Solved by the Invention

Nevertheless, in the above-described spectroscopy module, upon attachment of the incident slit portion and the diode to the supporting body, there is a fear that a relative positional relationship between the incident slit portion and the diode may deviate, thus resulting in a decrease in reliability of the spectroscopy module.

Now, the present invention has been made in view of the above situation, an object of which is to provide a highly reliable spectroscopy module.

Means for Solving the Problems

In order to attain the above object, the spectroscopy module of the present invention is provided with a light-transmitting body portion, a spectroscopic portion for dispersing light made incident from a predetermined plane of the body portion into the body portion to reflect the light on the predetermined plane, and a light detecting element supported on the predetermined plane to detect the light dispersed and reflected by the spectroscopic portion, and in which the light detecting element is provided with a light passing opening through which the light made incident into the body portion passes, and an optical element for guiding the light made incident into the body portion is arranged on the light passing opening.

In the spectroscopy module, the light detecting element has the light passing opening through which the light made incident into the body portion passes. Therefore, it is possible to prevent the deviation of relative positional relationship between the light passing opening and the light detecting portion of the light detecting element. Further, the optical element for guiding the light made incident into the body portion is arranged on the light passing opening. Thus, a part of the light made incident into the body portion is not blocked by a light incident marginal part of the light passing opening, and the light made incident into the body portion can be guided securely. Therefore, according to the spectroscopy module, it is possible to improve the reliability.

In the spectroscopy module of the present invention, it is preferable that the light-incident edge plane of the optical element is projected from the light detecting element. Since the spectroscopy module is constituted as described above, it is possible to guide more securely the light made incident into the body portion.

In the spectroscopy module of the present invention, it is preferable that the light passing opening is provided with a recessed portion formed on the opposite side to the predetermined plane and a through hole formed on the bottom of the recessed portion. Further, the optical element is preferably arranged at the recessed portion. Since the spectroscopy module is constituted as described above, it is possible to guide securely the light made incident into the body portion and also make the through hole into a slit.

In the spectroscopy module of the present invention, it is preferable that a light absorbing layer having a light passing hole through which light made incident into the body portion passes, is formed on the predetermined plane and the optical element is in contact with the light absorbing layer in a state that the light-outgoing edge plane thereof is opposed to the light passing hole. Since the spectroscopy module is constituted as described above, it is possible to guide securely the light made incident into the body portion and also make the light passing hole into a slit.

In the spectroscopy module of the present invention, the optical element is preferably an optical fiber. Thereby, it is possible to guide the light received on the light-incident edge plane of the optical fiber, with the core diameter of the optical fiber kept as it is. In this instance, the optical fiber is preferably a bundle fiber. Thereby, the light made incident into the body portion can be increased in light quantity.

Effects of the Invention

According to the present invention, it is possible to improve the reliability.

DESCRIPTION OF REFERENCE NUMERALS

Figure 1:
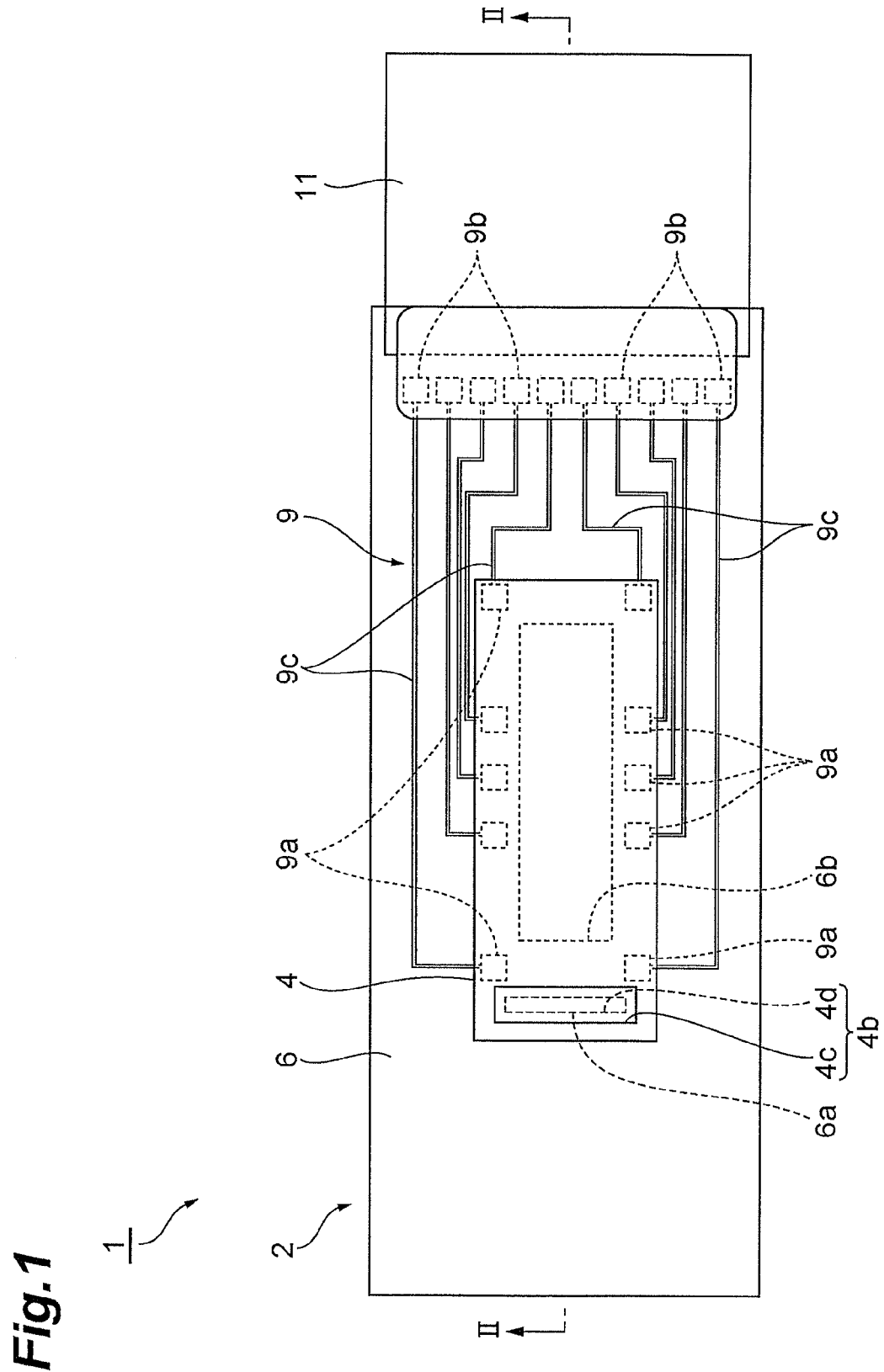
FIG. 1 is plan view of the spectroscopy module of a first embodiment.

1: spectroscopy module
2: body portion
$2_1$, $2_2$: light-transmitting members
2a: front plane (predetermined plane)
3: spectroscopic portion
4: light detecting element
6: light absorbing layer
6a: light passing hole
6b: light passing hole
7: optical element
7a: light-incident edge plane
7b: light-outgoing edge plane

BEST MODES FOR CARRYING OUT THE INVENTION

Hereinafter, a detailed description will be given to preferred embodiments of the present invention by referring to the drawings. It is noted that in the individual drawings, the same reference letters or numerals are given to the same and corresponding parts, with overlapping description omitted.

[First Embodiment]

Figure 2:
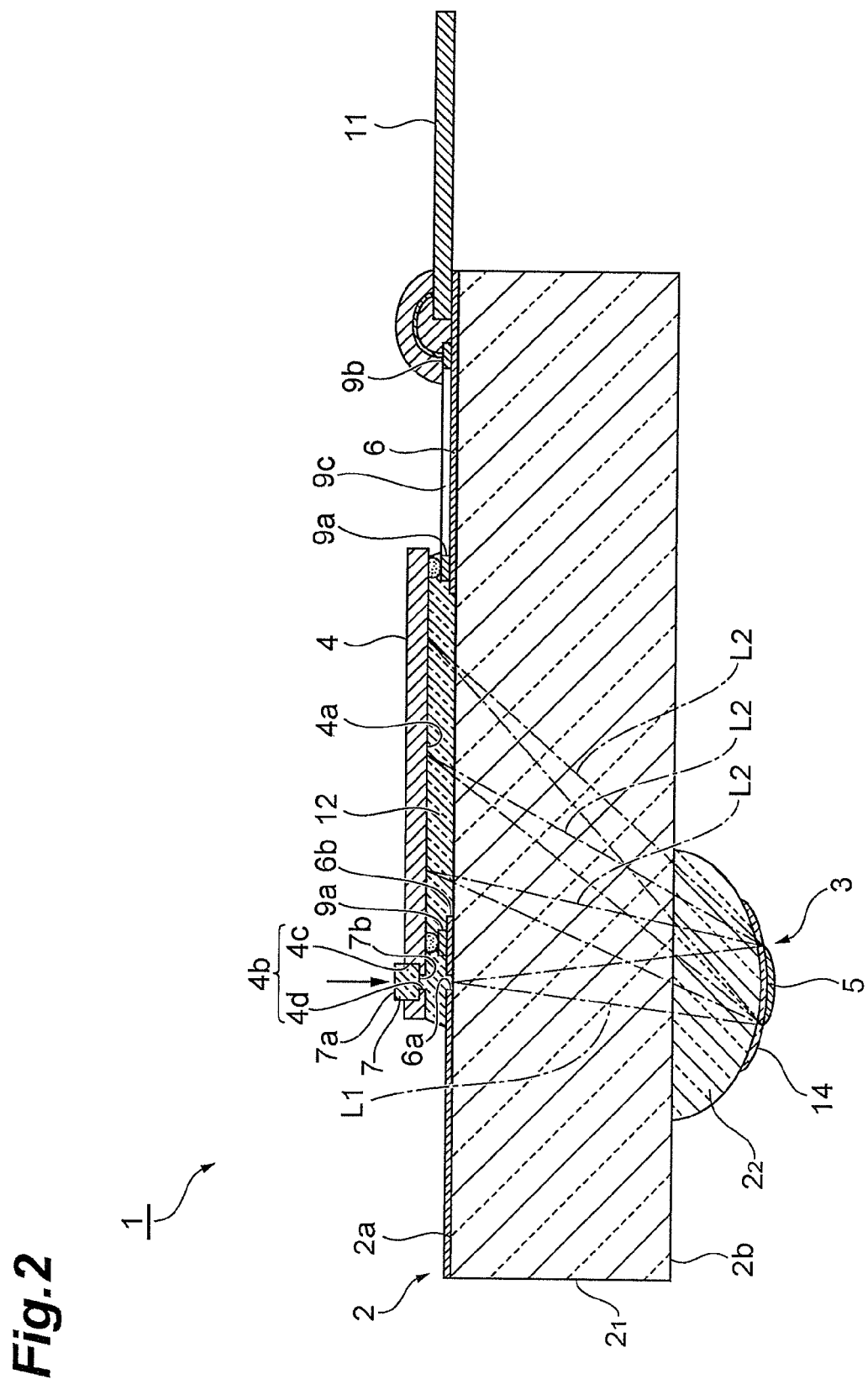
FIG. 2 is a cross sectional view taken along line II to II shown in FIG. 1.

As shown in FIG. 1 and FIG. 2, a spectroscopy module 1 is provided with a light-transmitting body portion 2, a spectroscopic portion 3 for dispersing light L1 made incident from a front plane (predetermined plane) 2a of the body portion 2 into the body portion 2 to reflect the light on the front plane 2a, and a light detecting element 4 supported on the front plane 2a to detect light L2 dispersed and reflected by the spectroscopic portion 3. The spectroscopy module 1 is to disperse the light L1 into a plurality of lights L2 by the spectroscopic portion 3 and detect the light L2 by the light detecting element 4, thereby measuring the wavelength distribution of the light L1, the intensity of a specific wavelength component, or the like.

The body portion 2 is provided with light-transmitting members $2_1, 2_2$ laminated in a direction approximately orthogonal to the front plane 2a. The light-transmitting member $2_1$ is formed in a rectangular thin shape by using light-transmitting glass such as BK7, Pyrex (registered trade mark) and quartz or a light-transmitting resin. The light-transmitting member $2_2$ is formed in a hemisphere by using the same material as that of the light-transmitting member $2_1$, that is, a light-transmitting organic-inorganic hybrid material or light-transmitting low-melting point glass for replica molding. And, for example, where the light-transmitting member $2_2$ is made with the same material as that of the light-transmitting member $2_1$, it is pasted to the body portion 2 with an optical resin or by direct bonding. The light-transmitting member $2_2$ acts as a lens for forming an image on a light detecting portion 4a of the light detecting element 4 on the basis of the light L2 dispersed and reflected by the spectroscopic portion 3. Further, the light-transmitting member $2_1$ is adjusted for the thickness, by which a position of the lens focused at the light detecting portion 4a can be optimized.

The spectroscopic portion 3 is a reflection-type grating having a diffraction layer 14 formed on the outer surface of the light-transmitting member $2_2$ and a reflection layer 5 formed on the outer surface of the diffraction layer 14. The diffraction layer 14 is a serrated cross-sectional blazed grating, a rectangular cross-sectional binary grating or a sinusoidal cross-sectional holographic grating, or the like. It is formed, for example, by coating a light-transmitting resin photosensitive to UV light (a photosensitive resin) on the outer surface of the light-transmitting member $2_2$ and then using a light-transmitting mold made of quartz or the like (grating mold) to subject the photosensitive resin to UV curing. The materials of the diffraction layer 14 are made more stable when heated and cured after UV curing. The reflection layer 5 is formed in a film shape, for example, by evaporating Al, Au or the like on the outer surface of the diffraction layer 14. Further, a protective film such as $MgF_2$ and $SiO_2$ is evaporated and formed on the reflection layer 5, thereby preventing the deterioration of the reflection film 5. It is noted that materials of the diffraction layer 14 shall not be limited to photosensitive resins but may include photosensitive glass, photosensitive organic-inorganic hybrid materials, heat-deformable resins/glass and organic-inorganic hybrid materials.

The light detecting element 4 is a photodiode array having the light detecting portion 4a in which long photodiodes are arrayed one-dimensionally in a direction approximately orthogonal to the longitudinal direction thereof. In the light detecting element 4, the direction of the one-dimensional array of photodiodes is approximately coincident with the longitudinal direction of the body portion 2 and also the light detecting portion 4a is arranged so as to face the front plane 2a of the body portion 2. It is noted that the light detecting element 4 shall not be limited to the photodiode array but may include a C-MOS image sensor and a CCD image sensor.

A light passing opening 4b through which light L1 made incident into the body portion 2 passes is formed on the light detecting element 4. The light passing opening 4b is provided with a recessed portion 4c formed on the opposite side to the front plane 2a of the body portion 2 and a through hole 4d formed on the bottom of the recessed portion 4c. The recessed portion 4c and the through hole 4d are formed in a rectangular opening shape extending in a direction approximately orthogonal to the longitudinal direction of the body portion 2, and the opening shape of the through hole 4d is narrower in width than the opening shape of the recessed portion 4c. They are formed by deep dry etching or others from both sides of a substrate of the light detecting element 4. It is noted that the opening shape of the through hole 4d shall not be limited to a rectangular shape but may include an oval shape or a circular shape.

An optical element 7 which guides light made incident into the body portion 2 is arranged at the recessed portion 4c. The optical element 7 is a rectangular parallelepiped member made with glass or the like, and the light-incident edge plane 7a of the optical element 7 is projected from the light detecting element 4. It is preferable that a fiber optics plate or the like is used in the optical element 7.

On the front plane 2a of the body portion 2, there is formed a light absorbing layer 6 having a light-passing hole 6a through which light L1 advancing to the spectroscopic portion 3 passes and a light-passing hole 6b through which light L2 advancing to the light detecting portion 4a of the light detecting element 4 passes. The light passing hole 6a is a slit extending in a direction approximately orthogonal to the longitudinal direction of the body portion 2. The light absorbing layer 6 is subjected to patterning so as to have the light passing holes 6a, 6b and formed integrally by using CrO, a CrO-containing laminated film, black resist or the like.

The light absorbing layer 6 is made rough on a front plane, and a wiring 9 farmed by using a single layer of Al, Au or the like or a laminated film of Ti—Pt—Au, Ti—Ni—An, Cr—Au or the like is formed on the front plane. The wiring 9 is provided with a plurality of pad portions 9a arranged around the light-passing hole 6b, a plurality of pad portions 9b arranged at the end of the body portion 2 in the longitudinal direction and a plurality of connection portions 9c for connecting the corresponding pad portions 9a and pad portions 9b. An external terminal of the light detecting element 4 is electrically connected to the pad portions 9a by flip chip bonding, and a flexible printed board 11 for taking out an output signal of the light detecting element 4 is electrically connected to the pad portions 9b by wire bonding. The light detecting element 4 is supported on the front plane 2a of the body portion 2 in a state that the light detecting portion 4a is opposed to the light-passing hole 6b of the light absorbing layer 6, and an optical resin 12 adjusted for the refraction index so that no reflection takes place on a boundary face is loaded as an underfill resin between the light detecting portion 4a and the front plane 2a.

An electrical insulation layer is preferably formed in a film shape between the light absorbing layer 6 and the wiring 9 by using an insulating resin such as $SiO_2$, SiN or SiON. This is because where the light absorbing layer 6 is made with black resist, the black resist is thermally affected and degenerated to be electrically conductive due to carbon contained on the light absorbing layer 6, and there may occur a short circuit if no electrical insulation layer is formed.

In the above-constituted spectroscopy module 1, light L1 is guided by the optical element 7, made incident from the front plane 2a of the body portion 2 via the through hole 4d and the light passing hole 6a of the light absorbing layer 6, advancing to the light-transmitting members $2_1$, $2_2$, arriving at the spectroscopic portion 3, and dispersed into a plurality of lights L2 by the spectroscopic portion 3. The thus dispersed light L2 is reflected on the front plane 2a of the body portion 2 by the spectroscopic portion 3, advancing to the light-transmitting members $2_2$, $2_1$, the light-passing hole 6b of the light absorbing layer 6, arriving at the light detecting portion 4a of the light detecting element 4, and detected by the light detecting element 4.

As described so far, in the spectroscopy module 1, the light detecting element 4 is provided with the light passing opening 4b through which light made incident into the body portion 2 passes. In addition, it is possible to prevent the deviation of the relative positional relationship between the light passing opening 4b and the light detecting portion 4a of the light detecting element 4. Further, the optical element 7 for guiding the light made incident into the body portion 2 is arranged on the light passing opening 4b. Thus, a part of the light made incident into the body portion 2 is not blocked by the light incident marginal part of the light passing opening 4b and the light made incident into the body portion 2 can be securely guided. Therefore, according to the spectroscopy module 1, it is possible to improve the reliability.

Further, the light-incident edge plane of the optical element 7 is projected from the light detecting element 4. The above constitution makes it possible to guide more securely light made incident into the body portion 2.

Still further, the light passing opening 4b is provided with a recessed portion 4c formed on the opposite side to the front plane 2a of the body portion 2 and a through hole 4d formed on the bottom of the recessed portion 4c, and the optical element 7 is arranged on the recessed portion 4c. The above constitution makes it possible to guide securely the light made incident into the body portion 2 and also make the through hole 4d into a slit.

In addition, the depth of the through hole 4d is preferably from 10 to 100 μm. Thereby, the optical resin 12 is securely filled into the through hole 4d and an air layer is less likely to be formed. Thus, it is possible to decrease unnecessary reflection resulting from the air layer and suppress the loss of light or stray light from being made incident into the light detecting element 4.

[Second Embodiment]

The spectroscopy module 1 of a second embodiment is different from the spectroscopy module 1 of the above-described first embodiment in that the optical element 7 is in contact with the light absorbing layer 6 in a state that the light-outgoing edge plane 7b is opposed to the light passing hole 6a.

Figure 3:
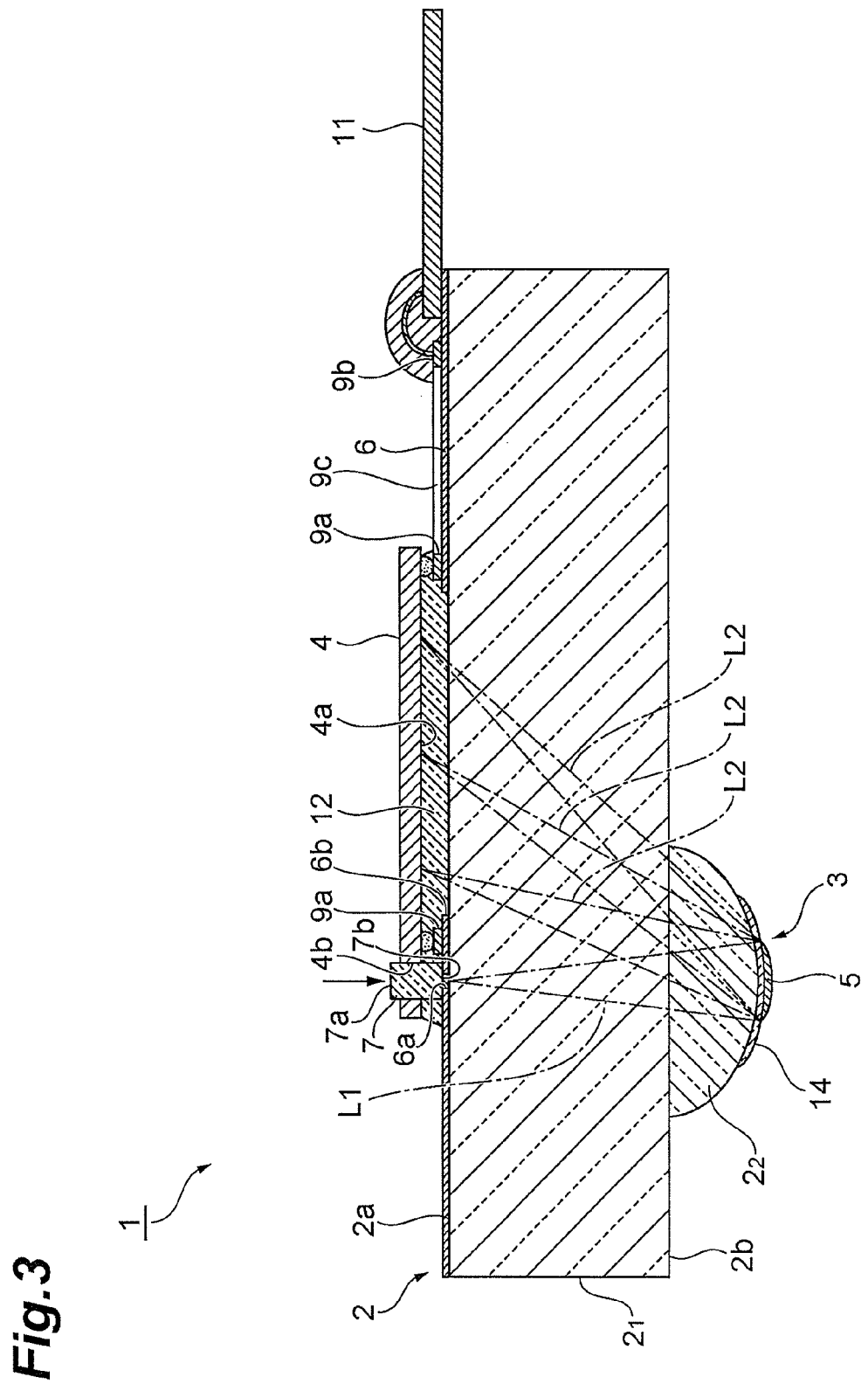
FIG. 3 is a longitudinal sectional view of the spectroscopy module of a second embodiment.

More specifically, as shown in FIG. 3, the light absorbing layer 6 having the light passing hole 6a through which light made incident into the body portion 2 passes is formed on the front plane 2a of the body portion 2, and the optical element 7 is in contact with the light absorbing layer 6 in a state that the light-outgoing edge plane 7b is opposed to the light passing hole 6a. Thereby, it is possible to guide securely the light made incident into the body portion 2 and also make the light passing hole 6a into a slit.

Further, the light passing opening 4b is formed in such a manner that a substrate of the light detecting element 4 is penetrated in a rectangular shape of the same size when viewed from the front plane thereof. Thereby, deep etching can be effected from one side of the substrate of the light detecting element 4 to form the light passing opening 4b easily.

The present invention shall not be limited to the above-described first and second embodiments.

An optical fiber may be used, for example, in the optical element 7 of the spectroscopy module 1 of the second embodiment. Thereby, it is possible to guide light received on the light-incident edge plane of the optical fiber, with the core diameter of the optical fiber kept as it is. In this instance, the light passing opening 4b is formed in such a manner that the substrate of the light detecting element 4 is penetrated in a circular shape of the same diameter when viewed from the front plane thereof.

Further, it is preferable that the core diameter of the optical fiber used here is greater in width size than the light passing hole 6a but smaller in longitudinal size than the light passing hole 6a. Thereby, the light outgoing plane of the optical fiber is in close proximity to the light passing hole 6a, by which the loss of light can be decreased.

It is noted that the optical fiber may be arranged on the light passing opening 4b so that the light-incident edge plane is projected from the light detecting element 4 or the leading end of the optical fiber may be arranged on the light passing opening 4b, while connected directly to a light source.

Further, the optical fiber may be a bundle fiber. Thereby, it is possible to increase the quantity of light made incident into the body portion.

INDUSTRIAL APPLICABILITY

According to the present invention, it is possible to improve the reliability.

The invention claimed is:

1. A method for manufacturing a spectroscopy module, wherein the module comprises:
   a light-transmitting body portion;
   a spectroscopic portion disposed on an outer surface of the body portion for dispersing light made incident from a predetermined plane of the body portion into the body portion and reflecting the light to the predetermined plane; and
   a light detecting element disposed on the predetermined plane for detecting the light dispersed and reflected by the spectroscopic portion, the method comprising the steps of:
   forming a diffraction layer along the outer surface of the body portion by providing a material for forming the diffraction layer on the outer surface of the body portion and then curing the material while using a mold; and
   forming the spectroscopic portion by forming a reflection layer on an outer surface of the diffraction layer.

2. A method according to claim 1, wherein the material is a photosensitive resin.

* * * * *